US012678979B2

(12) United States Patent
Nelson

(10) Patent No.: US 12,678,979 B2
(45) Date of Patent: Jul. 14, 2026

(54) FINGER MOUNTED VACUUM PICKUP TOOL

(71) Applicant: Kenneth Jeffrey Nelson, Sunnyvale, CA (US)

(72) Inventor: Kenneth Jeffrey Nelson, Sunnyvale, CA (US)

( * ) Notice: Subject to any disclaimer, the term of this patent is extended or adjusted under 35 U.S.C. 154(b) by 1003 days.

(21) Appl. No.: 17/889,379

(22) Filed: Aug. 16, 2022

(65) Prior Publication Data

US 2023/0054307 A1 Feb. 23, 2023

Related U.S. Application Data

(60) Provisional application No. 63/233,884, filed on Aug. 17, 2021.

(51) Int. Cl.
B25J 1/02 (2006.01)
B25J 15/06 (2006.01)

(52) U.S. Cl.
CPC .............. B25J 15/0616 (2013.01); B25J 1/02 (2013.01)

(58) Field of Classification Search
CPC ....... B25J 15/0616; B25J 1/02; B25B 11/005; B25B 11/007; F16B 47/00; F16B 47/006; H01L 21/6838; B65H 3/08; B65H 3/0808; B65H 3/0883; A61F 9/0061; B65G 47/91; A41D 13/087
See application file for complete search history.

(56) References Cited

U.S. PATENT DOCUMENTS

| | | | | |
|---|---|---|---|---|
| 450,447 | A | * | 4/1891 | Buchwalter .......... A41D 13/087 |
| | | | | 2/21 |
| 1,705,221 | A | * | 3/1929 | Jones .................... B65G 47/91 |
| | | | | 294/187 |
| 3,139,298 | A | * | 6/1964 | Grabiel ................ A61F 9/0061 |
| | | | | D24/150 |
| 4,286,815 | A | * | 9/1981 | Clark ................... A61F 9/0061 |
| | | | | 294/183 |
| 4,337,496 | A | * | 6/1982 | Laird ...................... H05C 1/06 |
| | | | | 231/7 |
| 4,387,921 | A | * | 6/1983 | Licata .................. A61F 9/0061 |
| | | | | 294/25 |
| 5,242,440 | A | * | 9/1993 | Shippert ............. H01H 9/0214 |
| | | | | 606/49 |
| 5,649,727 | A | * | 7/1997 | St. Louis ............. A61F 9/0061 |
| | | | | 294/187 |
| 5,693,041 | A | * | 12/1997 | Murphy-Chutorian ...................... |
| | | | | A61B 18/22 |
| | | | | 606/2 |

(Continued)

*Primary Examiner* — Son T Nguyen

(74) *Attorney, Agent, or Firm* — Plager Schack LLP; Mark H. Plager; Kara K. Verryt

(57) ABSTRACT

A finger mounted vacuum pickup tool for picking up a material may include a finger band configured to accommodate insertion of a user's finger therein; a ring cap attached to the finger band; and a vacuum cup attached to the ring cap, the vacuum cup including a cup portion and a protrusion extending from a rear surface of the cup portion, the protrusion having a vacuum cup channel extending therethrough, wherein the vacuum cup is configured to create a vacuum seal against the material. The ring cap may include a ring cap inlet channel extending from the vacuum cup to a vent port. The tool may further include an actuation button positioned within the vent port or a vacuum supply tube operatively attached to the ring cap.

9 Claims, 4 Drawing Sheets

(56)                    References Cited

U.S. PATENT DOCUMENTS

| | | | |
|---|---|---|---|
| 5,782,516 A * | 7/1998 | Partida | G11B 23/00 |
| 5,913,556 A * | 6/1999 | Perusse | A61F 9/0061 |
| | | | 294/25 |
| 6,112,330 A * | 9/2000 | Bryan | A41D 19/0031 |
| | | | 2/160 |
| 9,149,337 B2 * | 10/2015 | Schneider | A61B 46/00 |
| 9,320,566 B1 * | 4/2016 | Alston, Jr. | A61F 9/0061 |
| 2004/0260281 A1 * | 12/2004 | Baxter, III | A61B 90/53 |
| | | | 606/49 |

* cited by examiner

FINGER MOUNTED VACUUM PICKUP TOOL

RELATED APPLICATION

This application claims priority to provisional patent application U.S. Ser. No. 63/233,884 filed on Aug. 17, 2021, the entire contents of which is herein incorporated by reference.

BACKGROUND

The embodiments described herein relate generally to finger mounted tools and, more particularly, to a finger mounted vacuum pickup tool.

When it comes to manufacturing and other similar tasks, users often need to lift a material, such as a material with a flat face, from a nest or surface. Existing vacuums pick up tools are wands that are held like a pencil, between the thumb and another finger. While holding the existing tool, these fingers are not available for other, sequential tasks, such as data entry. As such, the user is forced to set down the existing tool to perform another sequential task and then pick up the existing tool once the other task is completed to begin again. Having to pick up and put down the existing tool not only creates inefficiencies, but also increases complexity required to complete the tasks.

Therefore, what is needed is a vacuum pickup tool that is removably attached to a user's hand to quickly vacuum lift a material with minimal impact on hand dexterity necessary for other sequential tasks, wherein the tool may reside on the user's hand and out of the way for most other hand tasks.

SUMMARY

Some embodiments of the present disclosure include a finger mounted vacuum pickup tool for picking up a material. The tool may include a finger band configured to accommodate insertion of a user's finger therein; a ring cap attached to the finger band; and a vacuum cup attached to the ring cap, the vacuum cup including a cup portion and a protrusion extending from a rear surface of the cup portion, the protrusion having a vacuum cup channel extending therethrough, wherein the vacuum cup is configured to create a vacuum seal against the material. The ring cap may include a ring cap inlet channel extending from the vacuum cup to a vent port. The tool may further include an actuation button positioned within the vent port or a vacuum supply tube operatively attached to the ring cap.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
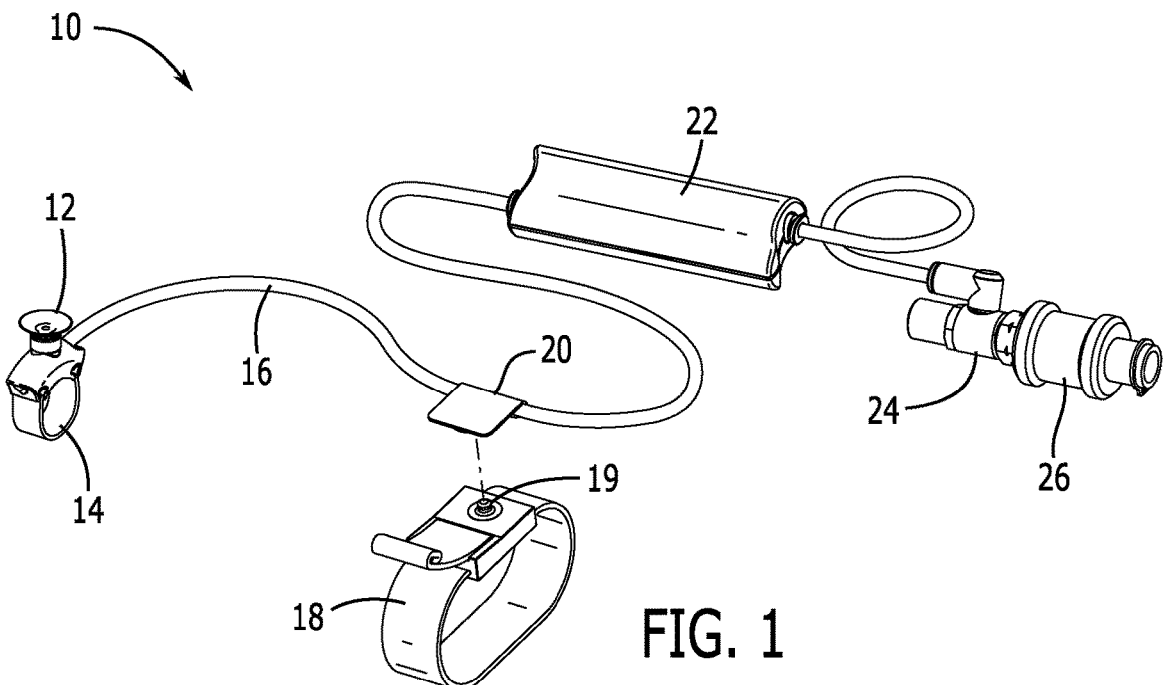
FIG. 1 is a pictorial perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a finger mounted vacuum pickup tool and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-9, some embodiments of the present disclosure include a finger mounted vacuum pickup tool for picking up a material 32, such as a substantially flat material, the tool comprising a finger band configured to fit around the finger of a user, a ring cap attached to the finger band, and a vacuum cup attached to the ring cap.

More specifically, and as shown in FIGS. 1-6, a first embodiment of a finger mounted vacuum pickup tool may comprise a finger band 14 sized to fit around a finger, such as an index finger 11A of a user; a ring cap 28 attached to the finger band 14, wherein the ring cap 28 is configured to be operatively attached to a vacuum generator 22; and a vacuum cup 12 attached to and extending from the ring cap 28, wherein the vacuum cup 12 includes a vacuum cup channel 13 configured to be operatively engaged with the vacuum generator 22.

Figures 7, 8, 9:
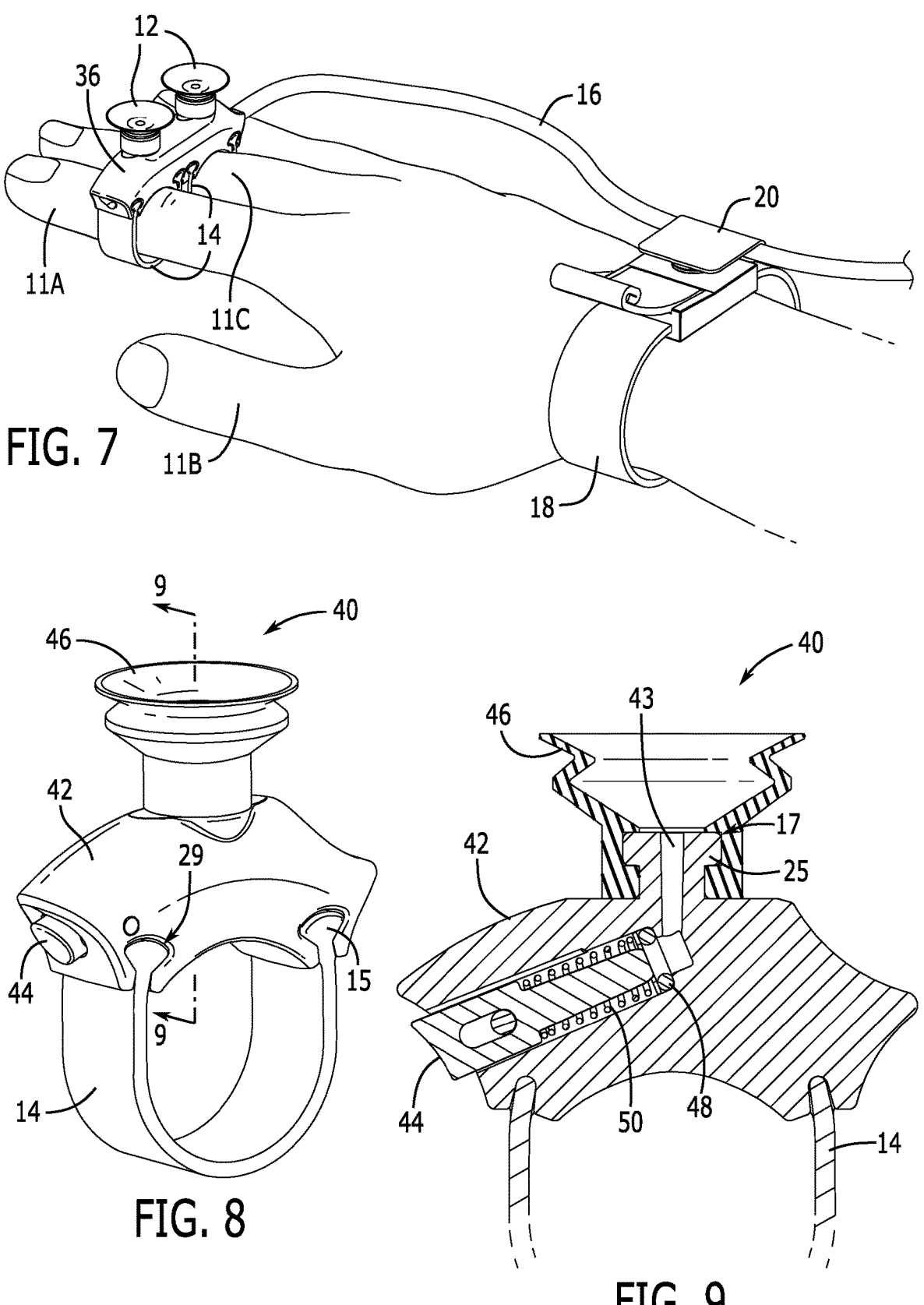
FIG. 7 is detail perspective view of one embodiment of the present disclosure, shown in use.
FIG. 8 is a perspective view of one embodiment of the present disclosure.
FIG. 9 is a cross-sectional view of one embodiment of the present disclosure, taken along line 9-9 in FIG. 8.

In embodiments, the finger band 14 may be removably engaged with the ring cap 28. In such embodiments, and as shown in the Figures, the finger band 14 may comprise a strip of material with a pair of ends 15 configured to removably engage with the ring cap 28. For example, an inner surface of the ring cap 28 (i.e., the surface facing the user's finger during use thereof) may comprise a pair of sockets 29, wherein each socket 29 is configured to accommodate an end of the pair of ends 15 on the finger band 14. In some embodiments, each end of the pair of ends 15 may removably engage with the respective socket 29 by being inserted therein. As shown in FIG. 8, each end 15 of the finger band 14 may be wider or thicker than a central portion of the finger band 14 and the interior of the socket 29 may be wider than an opening into the socket 29, such that the ends 15 of the finger band 14 may not be unintentionally pulled out of the sockets 29. Because the finger band 14 may be removable it may be easily interchanged with a differently sized finger band 14, as needed, to fit the desired user. While not shown in the Figures, in some embodiments, the device of the present disclosure may also include a finger size guide, comprising a card with a plurality of circular orifices extending therethrough, wherein each orifice may correspond with a specific finger band size. A user may determine which finger band 14 to engage with the ring cap 28 based on which circular orifice best fits around their finger. In alternate embodiments, the ring cap 28 may be fixedly attached to the finger band 14.

As shown in FIGS. 1-6, embodiments of the vacuum cup 12 may comprise a conventional suction cup shape including a cup and protrusion extending from a rear surface of the cup. A vacuum cup channel 13 may extend from an interior surface of the cup through the protrusion. In embodiments, the protrusion may include a vacuum cup nipple notch 17 extending therein, wherein the vacuum cup nipple notch 17 may be sized to engage with a nipple 25 extending from the ring cap 28. In an alternate embodiment, such as that shown in FIGS. 8 and 9, the vacuum cup may comprise a bellows vacuum cup 46, wherein the cup portion of the vacuum cup 46 comprises at least one bellow. In yet further embodiments, the vacuum cup may be fixedly attached to the ring cap 28.

Figure 2:
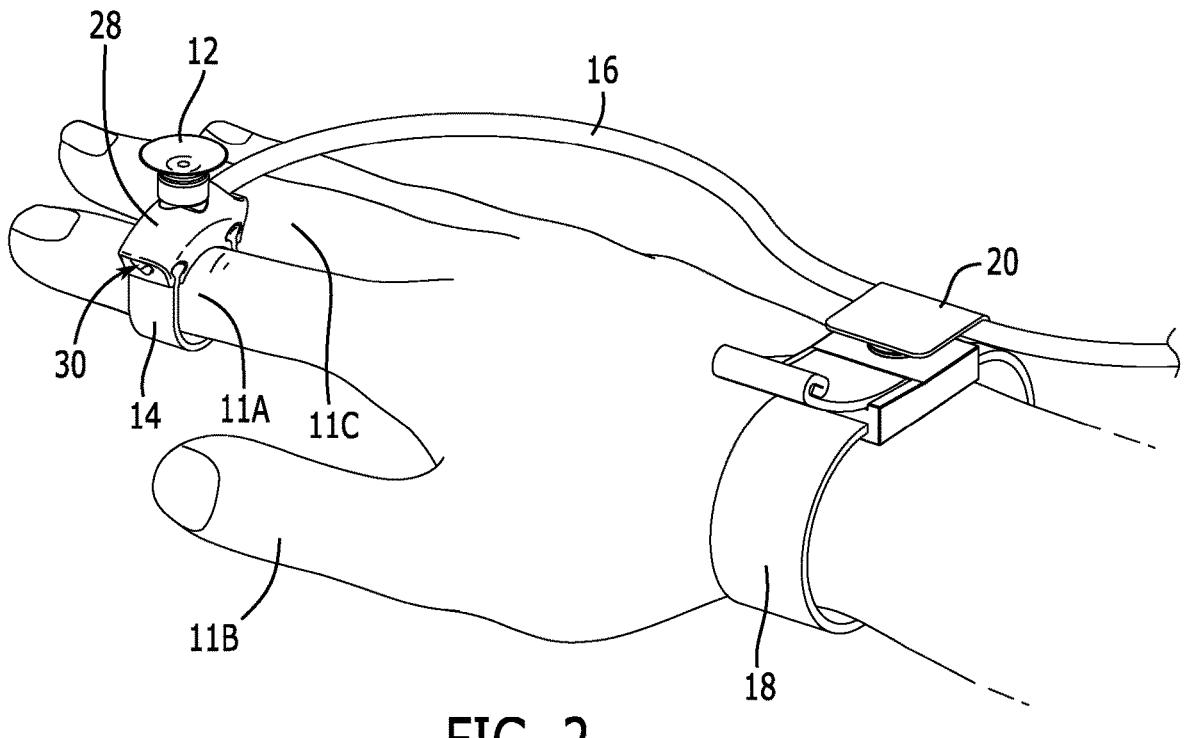
FIG. 2 is a detail perspective view of one embodiment of the present disclosure, shown in use.
Figure 3:
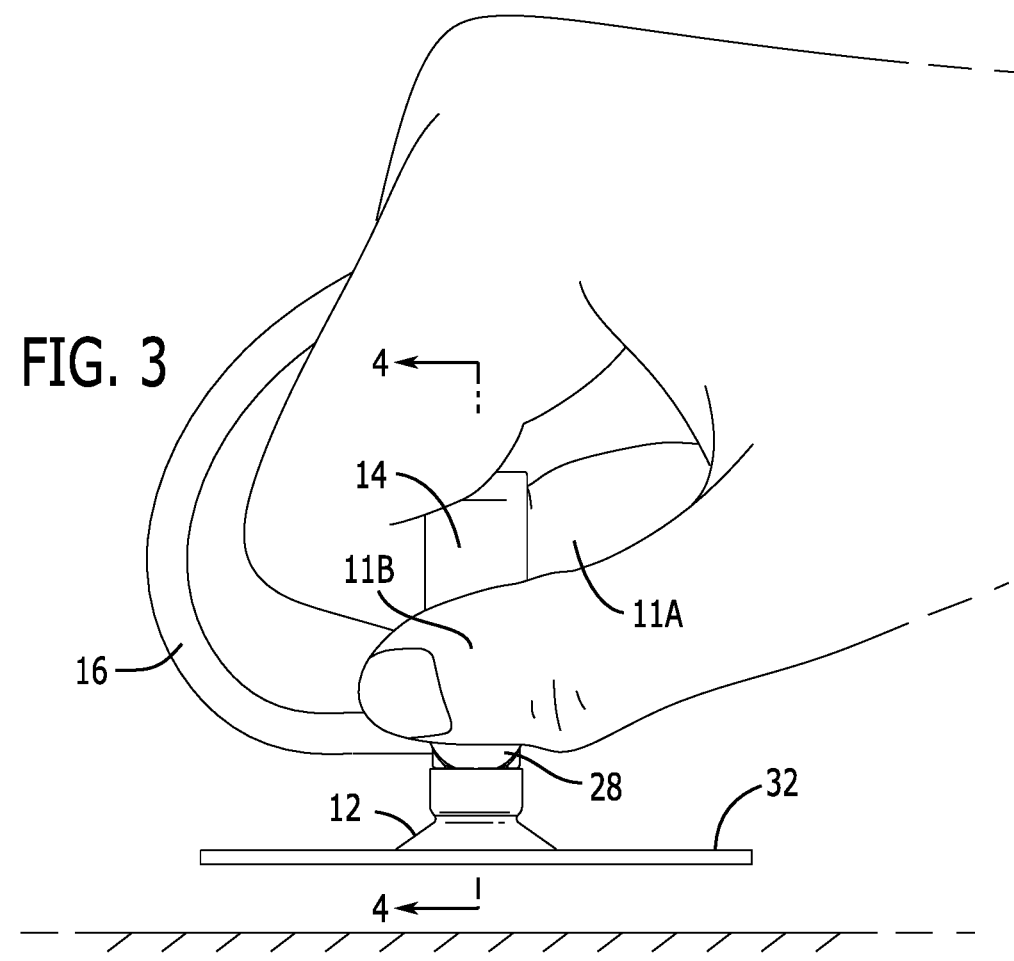
FIG. 3 is a detail elevation view of one embodiment of the present disclosure, shown in use.
Figure 4:
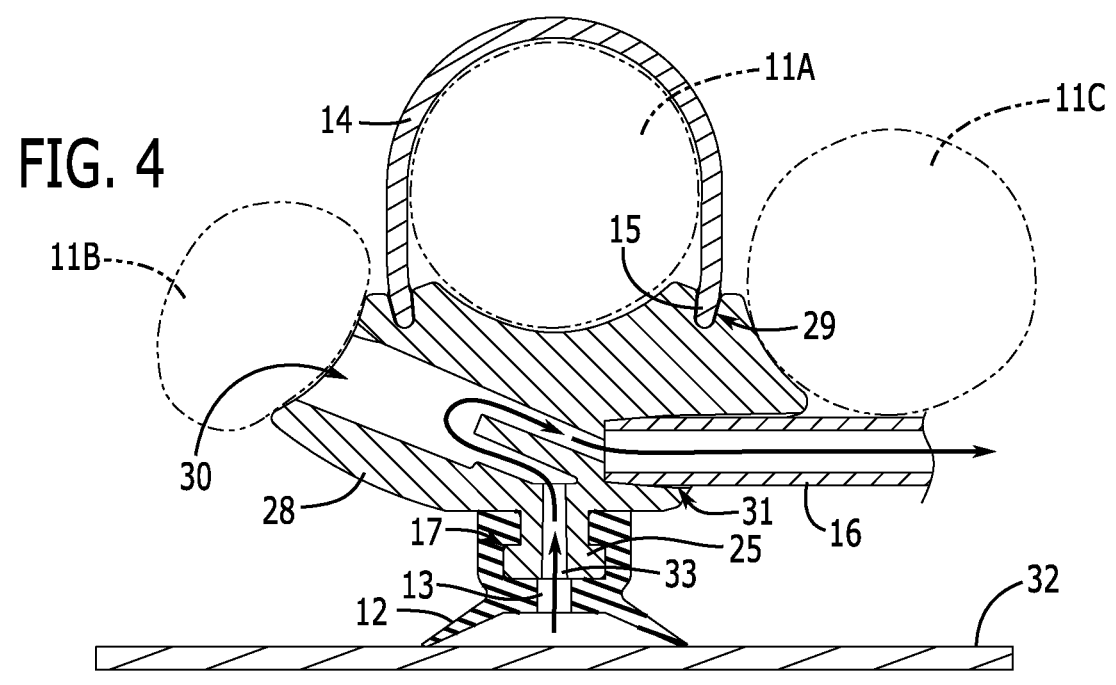
FIG. 4 is a cross-sectional view of one embodiment of the present disclosure, taken along line 4-4 in FIG. 3.

As shown in FIGS. 1-6, some embodiments of the ring cap 28 may comprise a ring cap body having a generally curved shape having an inner surface, an outer surface substantially parallel to the inner surface, a pair of elongate side surfaces, and a pair of shorter side surfaces. In use, the elongate side surface may be substantially perpendicular to a length of the user's fingers and the shorter side surfaces may be substantially parallel to a length of the user's fingers. As shown in the Figures, the inner surface of the ring cap may be generally convexly shaped to ergonomically conform to the shape of a user's finger. The inner surface may also include sockets 29 designed to removably engage with the finger band 14. A ring cap nipple 25 with a ring cap inlet channel 33 extending therethrough may extend outward from the outer surface of the ring cap body. A first side surface may include a supply tube channel 31 extending therein, and a second side surface may include a vent port 30 extending therein. As shown in FIG. 4, the ring cap inlet channel 33, the vent port 30, and the supply tube channel 31 may all be in fluid communication, wherein the internal channel may include a U-turn to prevent a vacuum forming at the juncture to the vacuum cup 12. When a vacuum cup 12 is engaged with the ring cap nipple 25, the vacuum cup channel 13 may also be in fluid communication with the ring cap inlet channel 33, the vent port 30, and the supply tube channel 31.

As shown in the Figures, a vacuum supply tube 16 may be operatively engaged with the ring cap 28. For example, the vacuum supply tube 16 may be inserted into the supply tube channel 31 in the ring cap 28. As shown in FIG. 1, the vacuum supply tube 16 may extend from the ring cap 28 to a vacuum generator 22, such as a venturi vacuum generator, which may be operatively attached to a flow regulator 24 and supply control 26, wherein the supply may be compressed air. Alternatively, the vacuum supply tube 16 may extend from the ring cap 28 to a vacuum pump (not shown), which negates the need for a flow regulator and supply control 26. In some embodiments, the tool 10 of the present disclosure may further comprise a wrist strap 18 sized to encircle a user's wrist, wherein the wrist strap includes a wrist strap fastener 19 extending therefrom. A tube grip 20 may be operatively engaged with the vacuum supply tube 16 and may removably engage with the wrist strap fastener 19 on the wrist strap 18, as shown in FIG. 1. The tube grip 20 may be configured to be repositioned along a length of the vacuum supply tube 16 to provide for a comfortable and compact tube service loop between the ring cap and the wrist. In some embodiments, such as that shown in FIG. 5, a top surface of the tube grip 20 may further comprise a fastener stud 21 extending upwards therefrom, wherein the fastener stud 21 is designed to removably and electrically engage with a ground lead 34, such that the tool may be electrostatic discharge (ESD) safe when each of the vacuum cup, ring cap, ring band, tubing, and tube grip are made of ESD safe materials.

When the vacuum supply tube 16 is inserted into the ring cap 28, the vacuum generator 22 will be in fluid communication with the vent port 30, the ring cap inlet channel 33, and the vacuum cup channel 13. In some embodiments, the vacuum supply tube 16 may have a bonded joint with the ring cap 28 for robustness. When the vacuum generator 22 is powered on, a user may block the vent port 30 with, for example, a thumb 11B, causing the vacuum generator 22 to suck air from an exterior of the vacuum cup 12, through the vacuum cup channel 13, through the ring cap 28, and through the vacuum supply tube 16 to the vacuum generator 22. As such, if the vacuum cup 12 is placed against a surface, such as a flat material 32, a vacuum is formed, enabling the user to easily lift the material 32. To release the vacuum, the user may simply remove his or her thumb 11B from the vent port 30.

Figure 5:
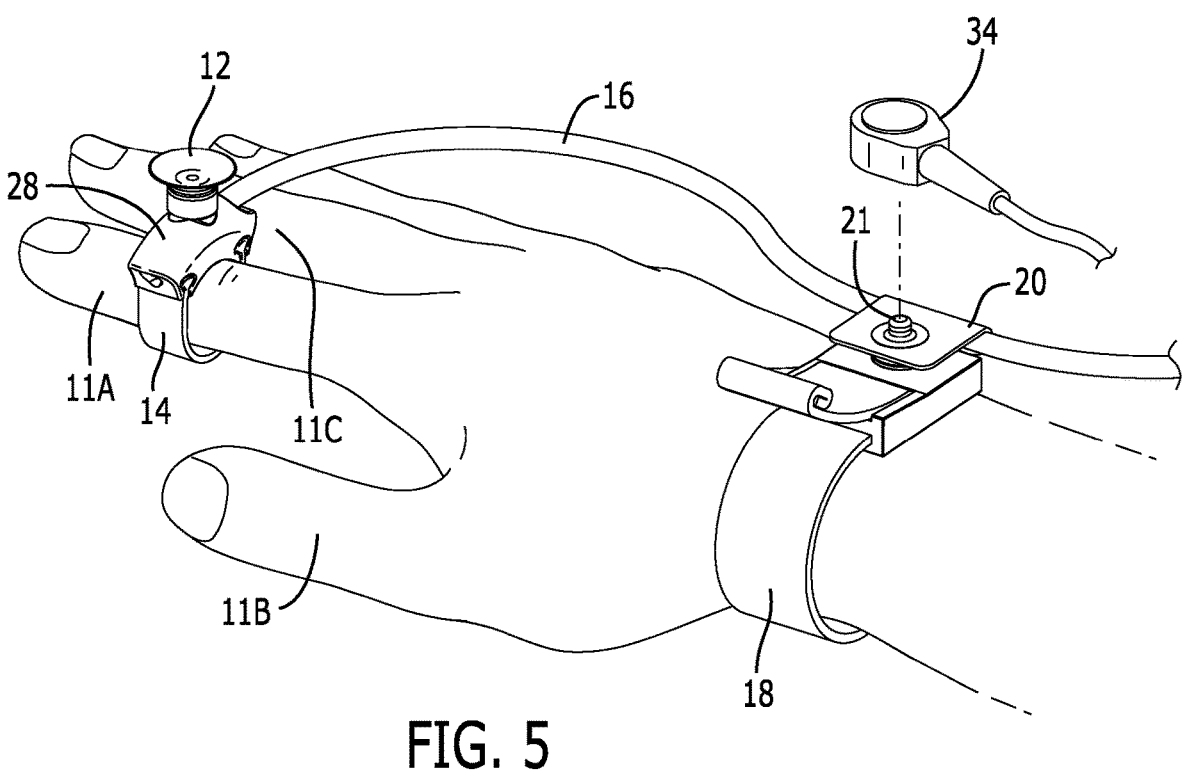
FIG. 5 is an exploded perspective view of one embodiment of the present disclosure, showing the addition of a ground lead 34.
Figure 6:
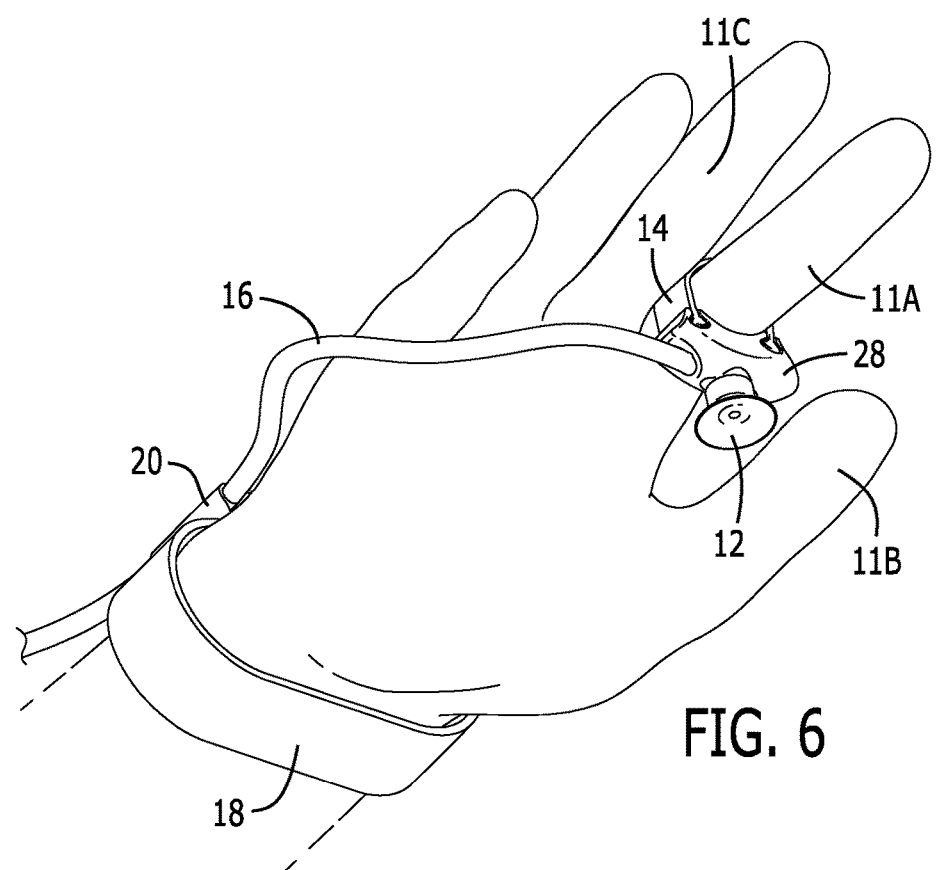
FIG. 6 is a detail perspective view of one embodiment of the present disclosure, shown in use in an alternate position.

As described above, the ring cap 28 may be designed to be worn on a single finger, such as an index finger 11A, such that the vacuum cup 12 is extending upwards from an upper surface of the index finger 11A, as shown in FIGS. 2, 3, and 5. When worn in this position, the user's thumb 11B may be positioned to open and close off the vent port 30, while the user's middle finger 11C may be positioned against the ring cap 28 proximate to the vacuum supply tube 16. In an alternate use, such as that shown in FIG. 6, the ring cap 28 may be positioned such that the vacuum cup 12 extends from a bottom surface of the user's index finger 11A. In this position, the ring cap 28 may be slid onto the finger in the opposite orientation, such that the user's thumb 11B is still positioned to engage and disengage from the vent port 30.

In alternate embodiments, the ring cap may be engaged with multiple vacuum cups and multiple finger bands. For example, as shown in FIG. 7, the ring cap 36 may be engaged with two vacuum cups 12 and two finger bands 14. As such, the ring cap 36 may comprise a pair of ring cap nipples 25 extending upwards therefrom, wherein each ring cap nipple 25 is designed to engage with a vacuum cup 12 and wherein each ring cap nipple 25 includes a ring cap inlet channel 33 extending therein and in fluid communication with the supply tube channel 31 and the vent port 30. Operation of this embodiment of the tool of the present disclosure may be similar to the operation of the version with a single vacuum cup 12 but for positioning both suction cups 12 against the material to be lifted.

In yet a further embodiment, the tool of the present disclosure may be cordless and, thus, may not rely on a vacuum generator for use thereof. More specifically, as shown in FIGS. 8 and 9, a cordless tool 40 may comprise a cordless ring cap 42 having a ring cap body similar to that of the ring cap 28. A vacuum cup with a nipple notch 17 may still be engaged with a ring cap nipple 25 extending from an outer surface of the ring cap body, wherein the ring cap nipple 25 has an inlet channel 43 extending therein. However, the cordless ring cap 42 may not include a supply tube channel. Rather, that side of the cordless ring cap 42 may be substantially solid, and an activation button 44 may be positioned within the vent port 30. The activation button 44 may comprise a substantially cylindrical body, wherein a distal end of the cylindrical body comprises a button head and a proximal of the cylindrical body has a smaller diameter than the distal end. A spring 50 may encircle the proximal end of the cylindrical body, wherein a seal 48 may be positioned adjacent to the proximal end of the cylindrical body. When the actuation button 44 is pressed into the cordless ring cap 42, the seal 48 may block the inner end of the inlet channel 43.

As shown in FIGS. 8 and 9, the vacuum cup used with the cordless ring body 42 may be a bellows vacuum cup 46 comprising at least one bellow in the cup portion thereof. As such, to lift a material, the bellows vacuum cup 46 may be placed against the material to be lifted and force may be applied to the tool, causing the bellows vacuum cup 46 to compress against the material to become sealed. While maintaining force, the activation button 44 may be pressed into the cordless ring cap 42, causing the seal 48 to engage with the inlet channel 43 and fully seal the inlet channel 43. When the tool is lifted, the compressed bellows vacuum cup 46 attempts to rebound to its original shape, increasing its internal volume and, thus, reducing its internal pressure, creating a vacuum seal between the material to be lifted and the bellows vacuum cup 46. To release the vacuum seal, the activation button 44 may simply be released.

Components of the tool of the present disclosure may be made of varying materials, such as plastic, metal, and the like. The vacuum cup may comprise a material conventionally used to make suction cups, and the finger band may comprise an elastomer or other similar material. The vacuum generator may be any conventional vacuum generator. Similarly, the flow regulator (i.e., an adjustable flow restrictor or needle valve) or a pressure regulator and supply control (i.e., on-off valve) may also comprise conventional or suitable devices.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A finger mounted vacuum pickup tool for picking up a material, the tool comprising:
   a finger band configured to accommodate insertion of a user's finger therein;
   a ring cap attached to the finger band; and
   a vacuum cup attached to the ring cap, the vacuum cup including a cup portion and a protrusion extending from a rear surface of the cup portion, the protrusion having a vacuum cup channel extending therethrough, wherein:
   the vacuum cup is configured to create a vacuum seal against the material;
   the ring cap comprises:
      a ring cap body comprising an inner surface, an outer surface, a pair of elongate side surfaces connecting elongate edges of the inner surface to elongate edges of the outer surface, and a pair of shorter side surfaces connecting shorter side surfaces of the inner surface to shorter side surfaces of the outer surface;
      the inner surface comprises a plurality of sockets, wherein each socket is configured to removably engage with an end of the finger band;
      a ring cap nipple extending outward from the outer surface of the ring cap body, the ring cap nipple including a ring cap inlet channel extending therethrough; and
      a vent port extending into a first shorter side surface of the pair of shorter side surfaces, wherein the vent port, the ring cap inlet channel, and the vacuum cup channel are in fluid communication.

2. The tool of claim 1, wherein the finger band is removably attached to the ring cap.

3. The tool of claim 1, wherein the vacuum cup is removably attached to the ring cap.

4. The tool of claim 1, further comprising an actuation button slidably engaged with the vent port.

5. The tool of claim 1, further comprising a supply tube channel extending into a second shorter side surface of the pair of shorter side surfaces,
   wherein:
      the supply tube channel is in fluid communication with the vent port, the vacuum cup channel, and the ring cap inlet channel; and
      the supply tube channel is sized to accommodate insertion of a vacuum supply tube therein.

6. The tool of claim 5, further comprising:
   a vacuum supply tube inserted into the supply tube channel;
   a wrist strap with a wrist strap fastener extending therefrom;
   a tube grip operatively engaged with the vacuum supply tube and removably attached to the wrist strap fastener.

7. The tool of claim 6, further comprising a ground lead operatively engaged with the tube grip.

8. The tool of claim 6, further comprising a vacuum generator operatively attached to the vacuum supply tube.

9. The tool of claim 8, further comprising a flow regulator and a supply control operatively attached to the vacuum generator.

\* \* \* \* \*